United States Patent
Pitwon

(10) Patent No.: US 10,698,157 B2
(45) Date of Patent: Jun. 30, 2020

(54) METHODS OF FORMING WAVEGUIDES UTILIZING TEMPERATURE CONTROL

(71) Applicant: Seagate Technology LLC, Cupertino, CA (US)

(72) Inventor: Richard C.A. Pitwon, Fareham (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/958,200

(22) Filed: Apr. 20, 2018

(65) Prior Publication Data
US 2019/0324204 A1  Oct. 24, 2019

(51) Int. Cl.
*G02B 6/125* (2006.01)
*G02B 6/12* (2006.01)
*G02B 6/138* (2006.01)

(52) U.S. Cl.
CPC ......... *G02B 6/125* (2013.01); *G02B 6/12002* (2013.01); *G02B 6/138* (2013.01); *G02B 2006/12135* (2013.01)

(58) Field of Classification Search
CPC .... G02B 6/125; G02B 6/12002; G02B 6/138; G02B 2006/12135; G02B 2006/12166; G02B 6/13
See application file for complete search history.

(56) References Cited

U.S. PATENT DOCUMENTS

| | | |
|---|---|---|
| 5,932,397 A | 8/1999 | Mustacich |
| 8,427,925 B2 | 4/2013 | Zhao et al. |
| 8,737,777 B2 * | 5/2014 | Pitwon .................. G02B 6/125 385/32 |
| 9,044,907 B2 | 6/2015 | Pitwon |
| 9,251,837 B2 | 2/2016 | Zhu et al. |

OTHER PUBLICATIONS

Ma, et al., "Polymer-Based Optical Waveguides: Materials, Processing, and Devices", Oct. 2, 2002, *Adv. Mater.*, 14(19): 1339-1365.

* cited by examiner

*Primary Examiner* — John Bedtelyon
(74) *Attorney, Agent, or Firm* — Mueting Raasch Group

(57) ABSTRACT

Disclosed are methods of making a planar optical waveguide, the method including depositing an uncured waveguide material on a substrate, the uncured waveguide material having a first temperature when deposited and the uncured waveguide material having a density dependent on the temperature thereof; changing the temperature of at least a portion of the uncured waveguide material to a second temperature before curing, after curing, during curing or any combination thereof; and curing the uncured waveguide material to form the planar optical waveguide.

10 Claims, 16 Drawing Sheets

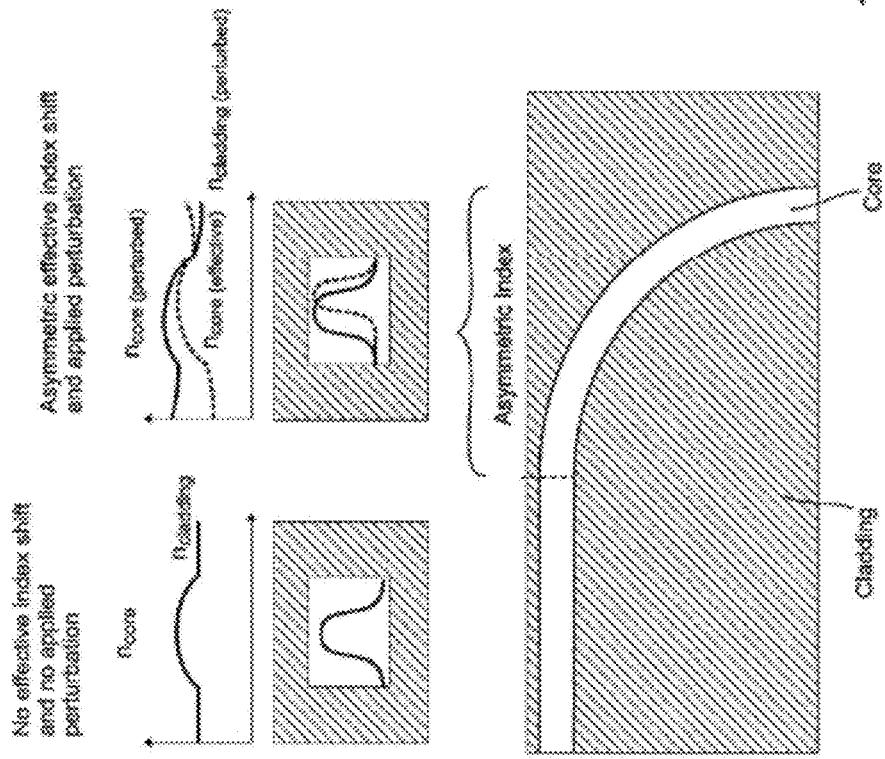

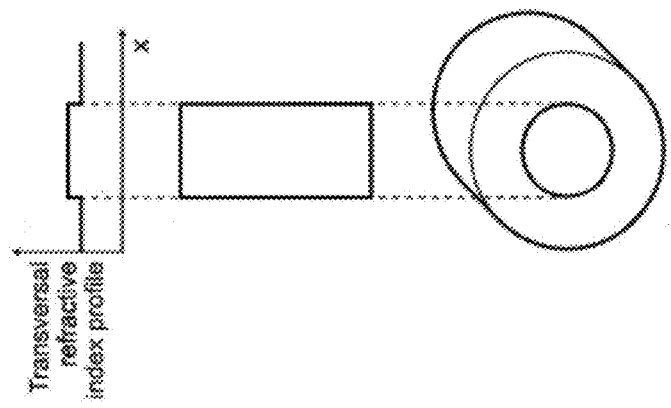
FIG. 12C
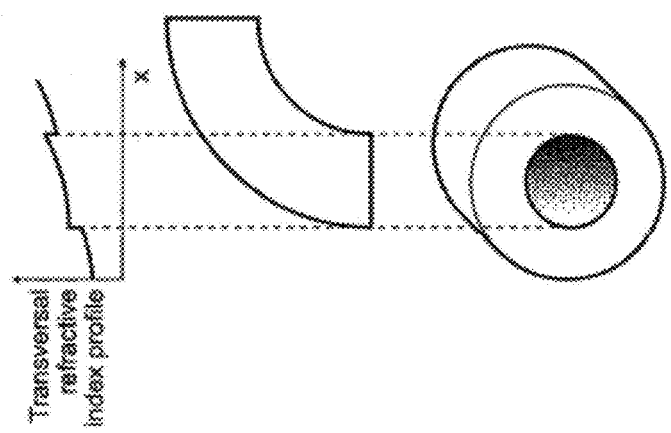
FIG. 12B
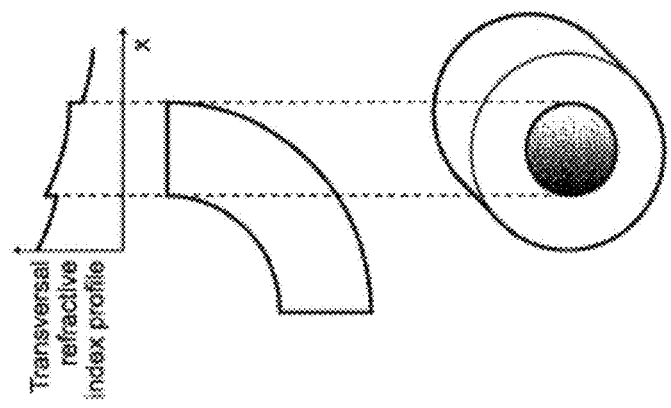
FIG. 12A
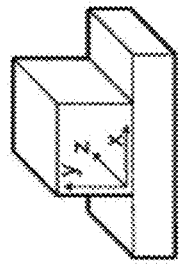

METHODS OF FORMING WAVEGUIDES UTILIZING TEMPERATURE CONTROL

The disclosure herein relates to optical waveguides and their fabrication to reduce optical losses in an optical waveguide on a printed circuit board.

SUMMARY

Disclosed are methods of making a planar optical waveguide, the method including depositing an uncured waveguide material on a substrate, the uncured waveguide material having a first temperature when deposited and the uncured waveguide material having a density dependent on the temperature thereof; changing the temperature of at least a portion of the uncured waveguide material to a second temperature; and curing the uncured waveguide material to form the planar optical waveguide, wherein the step of changing the temperature takes place before the curing step, after the curing step, during the curing step or any combination thereof.

In another embodiment, planar optical waveguides are disclosed that have a curved section, the planar optical waveguide comprising cured polymeric material, the planar optical waveguide having at least a portion of the cross-sectional refractive index profile controlled by heat conduction properties of the polymeric material when in the uncured state.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIG. 4 is a schematic diagram of a waveguide showing the mode distribution within a graded-index optical waveguide with the application of an asymmetric index perturbation;

FIGS. 12A to 12C show schematic three dimensional representations of cross-sections through a waveguide having a circular cross-section, as might be the case in for example, optical fibers or polymer optical fibers;

DETAILED DESCRIPTION

Figure 1:
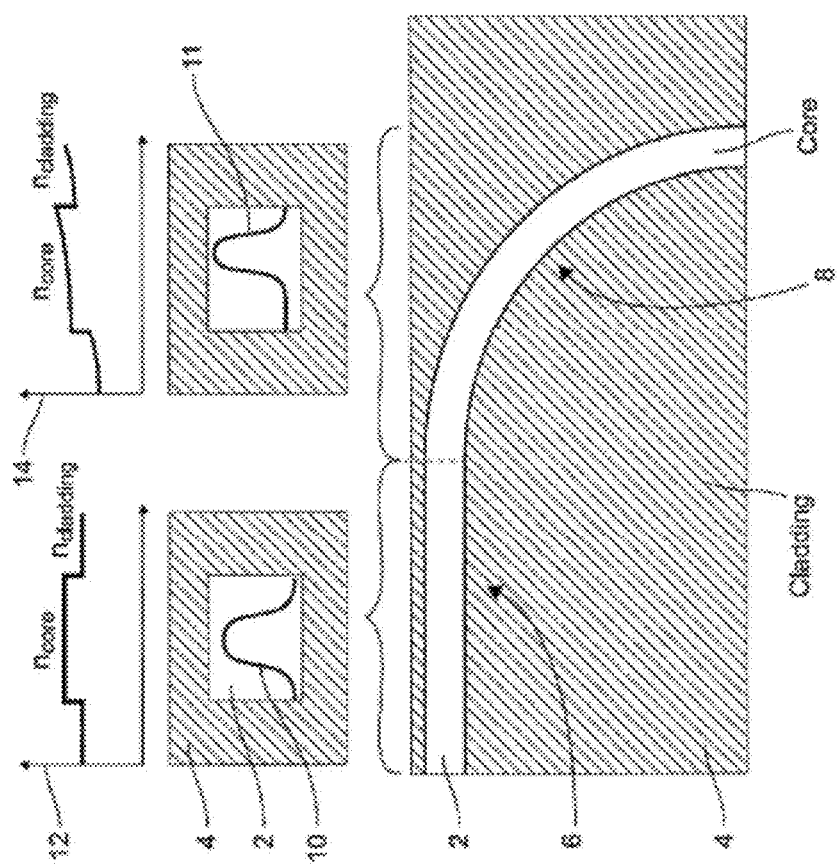
FIG. 1 is a schematic diagram of a waveguide showing the effect of curvature on the mode distribution within an optical waveguide in the case of a stepped index waveguide.

Polymer based optical waveguides provide numerous desirable properties for use in a multitude of electronic devices, including in some embodiments, data storage devices, network components, network appliances, routers, hubs and other similar devices. These waveguides can be formed on printed circuit boards (PCB), which, in turn, would be referred to as optical PCBs, or more generally, as optical boards. These waveguides and optical PCBs can function as a component or building block of a larger structure or apparatus. Alternatively, the waveguides and optical PCBs can function on their own without any other related devices or structures. The waveguides and optical PCBs can be integrated and connected to other structures and different components as well as in order to provide an assembly.

Planar polymer optical waveguides with targeted applications in optical circuit boards and photonic integrated circuit coupling are often limited in how they can be routed over a planar surface by the optical confinement characteristics of the particular waveguide. For example, the tighter a waveguide is bent, the more light will be lost from it due to the breakdown of total internal reflection. Another example is that waveguides crossing through each other will exhibit different levels of crosstalk depending on the crossing angles. This restriction on geometry can be highly limiting when embedded waveguides into a densely populated multi-layer electro-optical PCB.

Polymer waveguides are typically manufactured using an ultraviolet (UV) curing process whereby liquid uncured polymer is exposed to a beam of UV light which cures it. Methods disclosed herein include changing the temperature of uncured waveguide material prior to, after, and/or during the curing process in order to create a density variation and associated refractive index variation along the waveguide cross-section, which compensates for performance degradation when the waveguide geometry is changed, for example when the waveguide is about to change direction (e.g. when a tight bend is introduced), when the waveguide is about to cross over another waveguide at a certain angle, when a waveguide is split into multiple waveguides, or any combination thereof.

It is known to fabricate polymer waveguides using ultraviolet (UV) curing techniques. This approach involves applying UV radiation to resins or polymers to cause photo-polymerization thereof. In a photo-polymerization reaction, a monomer (comprising a single organic unit) or an oligomer (a molecule comprising a small number of organic units) is converted, or cross-linked, to form a solid cross-linked polymer.

This is achieved using a photo-polymerization initiator compound forming part of the mixture. The initiator compound is excited by the absorption of photons, resulting in either cleavage, Hydrogen abstraction, or electron transfer. Therefore, when the monomer/oligomer/initiator mixture is excited by photons of a specific wavelength, substances such as radical molecules or hydrogen ions are generated. The generated radical molecules and hydrogen ions, attack the oligomer and/or monomer units, resulting in a three-dimensional polymerization or cross-linking reaction taking place.

A liquid-state curable resin mixture (which comprises monomer and oligomer units and an initiator) is usually cured by the following steps:

1. Photo-polymerization initiators absorb photons;
2. These photo-polymerization initiators that have absorbed the photons are excited through photolysis;
3. Activated photo-polymerization initiators react with the oligomers or monomers through decomposition; and
4. A chain reaction cross-linking the oligomers and monomers proceeds, resulting in a three-dimensional cross-linking reaction which increases the molecular weight of the polymer and curing the mixture.

When photons are used to cure the resin, the factors of the irradiation intensity (i.e. irradiation energy per unit area) (measured in $mW/cm^2$) and exposure (measured in $mJ/cm^2$) are important. In addition, the excitation wavelength must be chosen such that the photons are absorbed by the initiator compounds in order for the cross-linking operation to proceed. A fully cross-linked polymer will have a substantially constant refractive index throughout its bulk.

Optical channels are often required to undergo a number of direction changes, such as when they form part of an optical layout configuration on an optical PCB. However, whenever an optical channel undergoes a change of direction an optical bend transition loss occurs. This comprises a loss of signal power which occurs when the radius of curvature of a waveguide changes along its axis and is due to the change in supportable optical modes in the new waveguide segment.

This effect is strongest when the radius of curvature is suddenly reduced along the course of a waveguide, such as when an optical signal propagates from a straight waveguide segment to a bent segment. This is particularly relevant for optical PCBs, where a large number of sharp direction changes may be required due to the need to circumnavigate certain features inherent to the PCB (such as through-vias, clearances or components) and to accommodate large optical channel densities on the PCB.

Optical bend transition loss is amongst the largest loss mechanisms in planar optical channels and, therefore, is a significant factor in restricting the design of optical waveguides in terms of the trade-off between the number of bends, radius of curvature of bends and the length of the waveguide. In effect, in-plane bend transition loss is a technology inhibitor for embedded planar optical waveguides and, more specifically, for optical PCBs.

Figure 2:
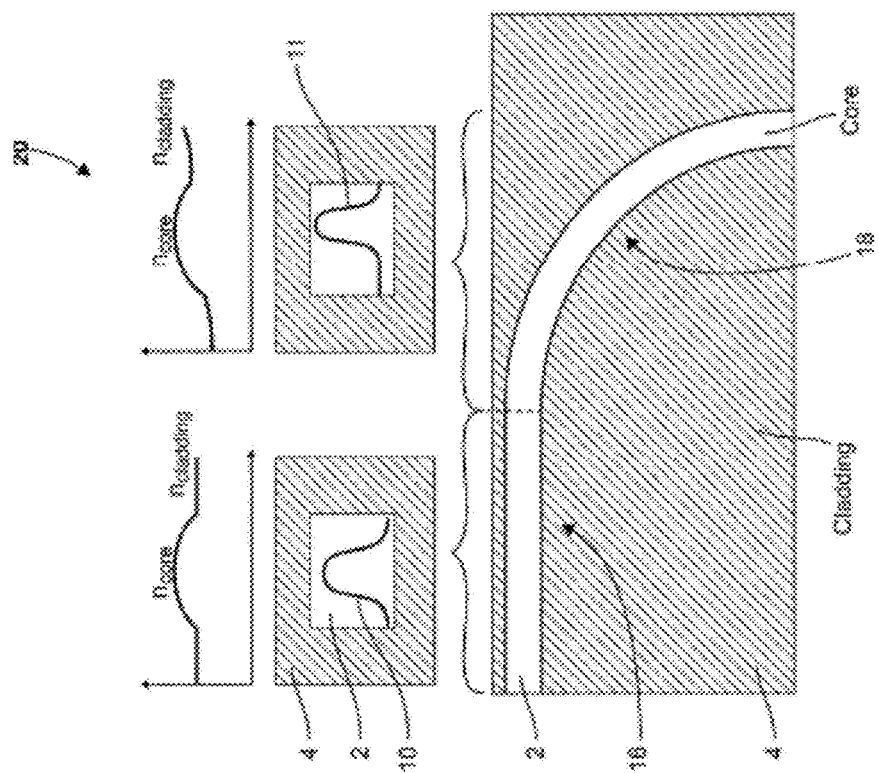
FIG. 2 is a schematic diagram of a waveguide showing the effect of curvature on the mode distribution within an optical waveguide in the case of a graded index waveguide.

FIGS. 1 and 2 illustrate examples of optical waveguides. FIG. 1 shows a schematic representation of a waveguide core 2 surrounded by cladding 4. The waveguide core 2 comprises a straight section 6 followed by a curved section 8.

FIG. 1 also includes schematic views 10 and 11 of a supported optical mode (in this case the fundamental mode) of an optical signal propagating along the waveguide. As can be seen, in the straight section 6, the mode 10 propagates through the center of the waveguide core. As the optical signal continues into the curved section the optical signal energy is transferred from the fundamental mode to the higher order mode(s) 11 along the outer bend region. In effect, the mode 10 is forced into the outer region of the curved waveguide core such that it is no longer supported centrally. This transfer of the optical signal energy in mode 10 from the center of the core to higher order modes in a different outer region thereof is the same effect as would occur if the waveguide remained straight but the refractive index profile varied asymmetrically as shown in graph 14.

This has the deleterious effect that the mismatches in supportable mode profiles between sections with different radii cause optical loss when optical energy propagates from a first section to a second section wherein some of the modes supported in the first section are no longer supported in the second section.

For example, to consider the problem from an optical ray point of view, when an optical signal transitions from a straight waveguide section to a bent waveguide section, a fraction of the signal energy is expelled as the angles formed by some of the light rays with the waveguide boundary are no longer at or below the critical angle required to satisfy the conditions for total internal reflection within the waveguide. This is known as the bend transition loss. Accordingly, any reduction in the radius of curvature along the waveguide typically gives rise to a leakage of optical energy from the waveguide.

The number of bends that can be introduced in a waveguide is also limited since if more than a certain number are introduced then the effect of bend loss can reduce the quality and power of the signal to a level which is unacceptable for reliable data transfer. In addition, the bend radii that can be applied to embedded optical channels are also subject to constraints since the smaller the bend radius, the higher the bend loss. Such restrictions are clearly undesirable and naturally impact on the use of embedded optical channels in high density electro-optical PCBs in data communication systems such as rack scale data storage, high performance computing or supercomputing systems.

FIG. 2 shows a similar view to that of FIG. 1 except in this case the waveguide has a typical graded-index profile, whereby the refractive index of the core varies parabolically across the core and symmetrically around the center of the core. However, graded index waveguides can also be prone to transition losses when there is a sudden reduction in bend radius, though to a lesser degree than conventional step-index waveguides. A transfer of modal energy from lower order (central) modes to higher order modes can be observed when a signal transfers from a straight section 16 to a curved section 18.

A solution to the above problem has been proposed in the form of a waveguide having a refractive index which varies asymmetrically across the width of the waveguide. Simulations have shown that the loss in optical signal power propagating along waveguide bend transition points can be strongly reduced if asymmetric perturbations are applied to the transverse refractive index profile of the waveguide in curved sections. Examples of this are illustrated in FIGS. 3 and 4.

Figure 3:
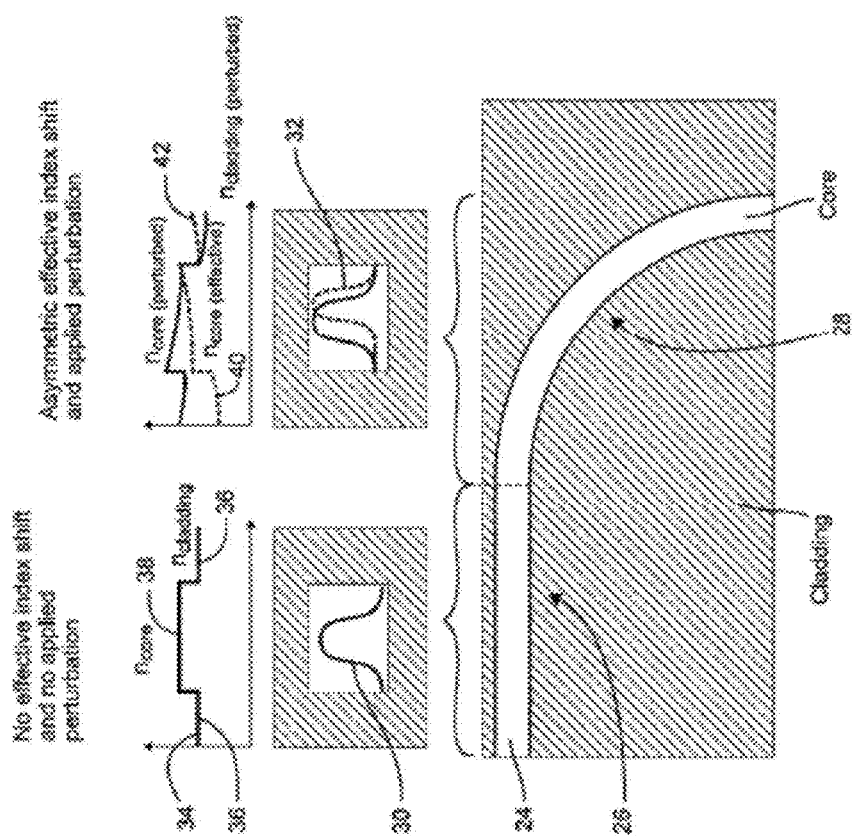
FIG. 3 is a schematic diagram of a waveguide showing the effect the mode distribution within a step-index optical waveguide with the application of an asymmetric index perturbation.

Referring firstly to FIG. 3, a waveguide 24 is provided having a straight section 26 and a curved section 28. The curved section may be considered a cylindrically curved waveguide. As shown, in this configuration a perturbation is applied to the transverse refractive index profile of the bent waveguide segment to compensate for the redistribution of modal energy during the transition.

The refractive index perturbation is preferably applied to both the waveguide cladding and the waveguide core since the containment characteristics of the waveguide are affected by the refractive index difference between the cladding and the core (henceforth referred to as the delta) and it is preferable to maintain a consistent delta, as large variations can impact on certain waveguide performance characteristics such as dispersion. Waveguide dispersion determines the degree of pulse spreading in the waveguide and how far and how fast a signal can be sent before signal integrity is irretrievably impaired. Dispersion increases with the numerical aperture of the waveguide, which in turn increases with the delta between core and cladding.

This is particularly relevant when dealing with tighter bends requiring larger asymmetric index perturbations. If, for example, the required perturbations were applied to just the core and not the cladding, then the delta on the inner bend would be significantly larger than that on the outer bend, which would adversely affect signal integrity.

In general, and as can be seen in FIG. 3, the outer core edge 42 is an inflection point where the effective index is the same. The effective refractive index decreases moving radially toward the center of the curve from this point and decreases moving radially away from the center of the curve. Therefore, in order to compensate, the required perturbed index must increase moving radially toward the center of the curve from this point and decrease moving radially away from the center of the curve.

The refractive index profile for the waveguide 34 includes both cladding sections 36 and a core section 38. In this example, the waveguide has a typical step-index index profile, whereby the index of the core section 38 and cladding sections 36 have a flat profile. The required perturbation is applied to the refractive index of both the cladding and the core in the curved section 28 of the waveguide, with respect to that of the straight section 26.

The effective refractive index shift, signifying the profile, which applied to a straight waveguide segment, would cause it to behave like the curved waveguide 28, is shown with a dashed line. The refractive index required to compensate for the effect of the bend is shown in a solid line superposed in the same graph. It can thus be shown intuitively how the purpose of the required perturbation is to cancel the effective refractive index shift thus causing the waveguide to behave like a straight segment with the same profile as that of the preceding straight waveguide segment. Therefore, transition losses are eliminated or significantly reduced as the signal sees no change in boundary conditions (or effective refractive index profile) as it propagates from one segment to another.

FIG. 4 shows a similar embodiment to that of FIG. 3, except in this case the waveguide is not a step-index waveguide, but rather a graded-index waveguide, whereby the index of the core section varies parabolically around the center of the core, while the cladding has a flat index profile. As is the case for FIG. 3, the refractive index perturbation applied to the curved section counteracts the effect of the bend and thus eliminates bend transition loss as the optical signal propagates from the straight section to the curved section.

It is envisaged that a number of complex routing geometries may be required for a waveguide on an optical PCB. Therefore, such a waveguide will require correspondingly complex transverse refractive index profiles at different points along its axis. Moreover, the transverse refractive index profile may be required to change continuously along the length of the waveguide. Fabrication of such a profile in an optical polymer is a non-trivial problem.

Attempts to vary the refractive index of a polymer waveguide have met with limited success. Whilst a partially cross-linked polymer will have a different refractive index from a fully cross-linked polymer, techniques for exploiting this in a meaningful way do not currently exist. Beam shaping technology (such as filters which vary the intensity of the curing beam in the transverse direction) is not likely to give rise to significantly useful changes in refractive index due to the limited cross-linking responsivity of available optical materials to variations in curing intensity. Furthermore, such attempts may inadvertently lead to a variable curing profile in the depth direction because of the absorption of photons by the uppermost levels.

U.S. Pat. No. 5,932,397 discloses a multicolor lithographic process in which the wavelength-dependent variation of light penetration into a photosensitive polymer is used to provide three-dimensional control of the refractive index gradients in a polymer forming a waveguide. The disclosed method utilizes a lithographic mask for defining the exposed area of the waveguide. However, in this implementation, utilizing different wavelengths of light for different regions of the waveguide requires a different mask to be provided for each wavelength, resulting in limited flexibility to change the exposure pattern and more complicated and lengthy processing procedures.

Therefore, to date, a technical problem in the art is that it is difficult to manufacture optical polymer waveguides having complex and varying refractive indices of sufficient index variability using known methods.

The present invention relates to a method of fabricating polymer optical waveguides with arbitrary cross-sectional (transverse) refractive index profiles across the core of the waveguide, which can also be dynamically altered along the length or axis of the waveguide.

Figure 5A:
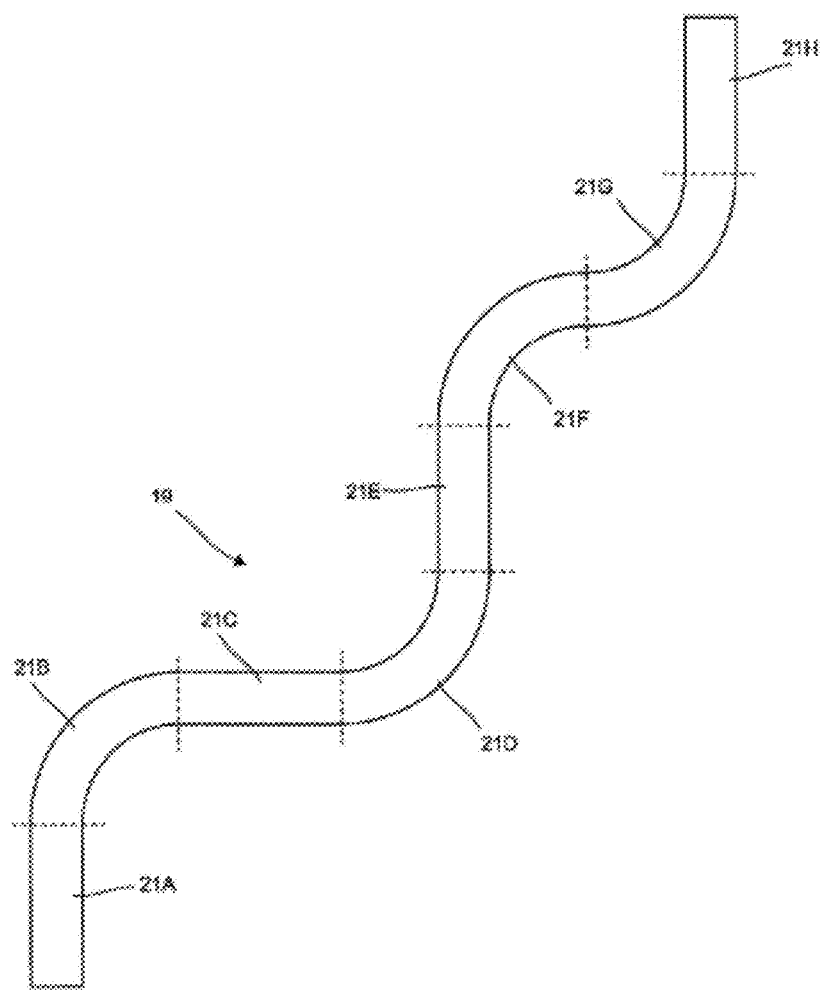
FIGS. 5A and 5B show schematic representations of a curved waveguide.
Figure 5B:
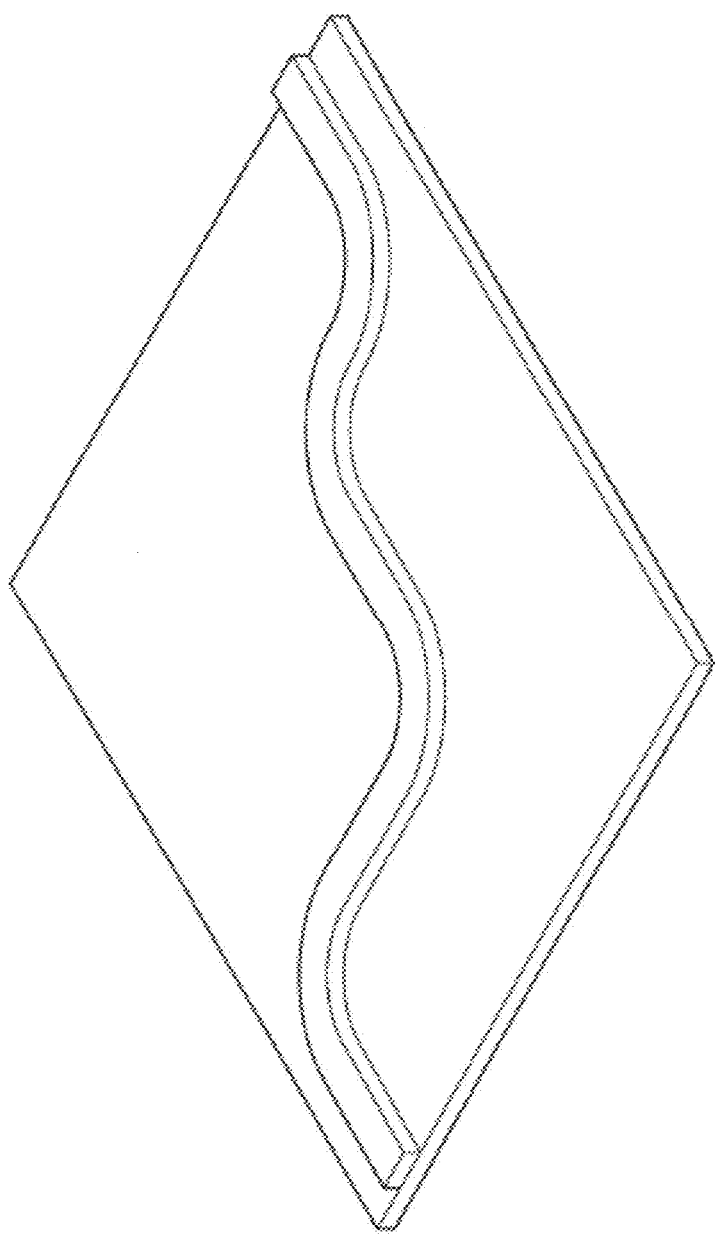
Figure 6:
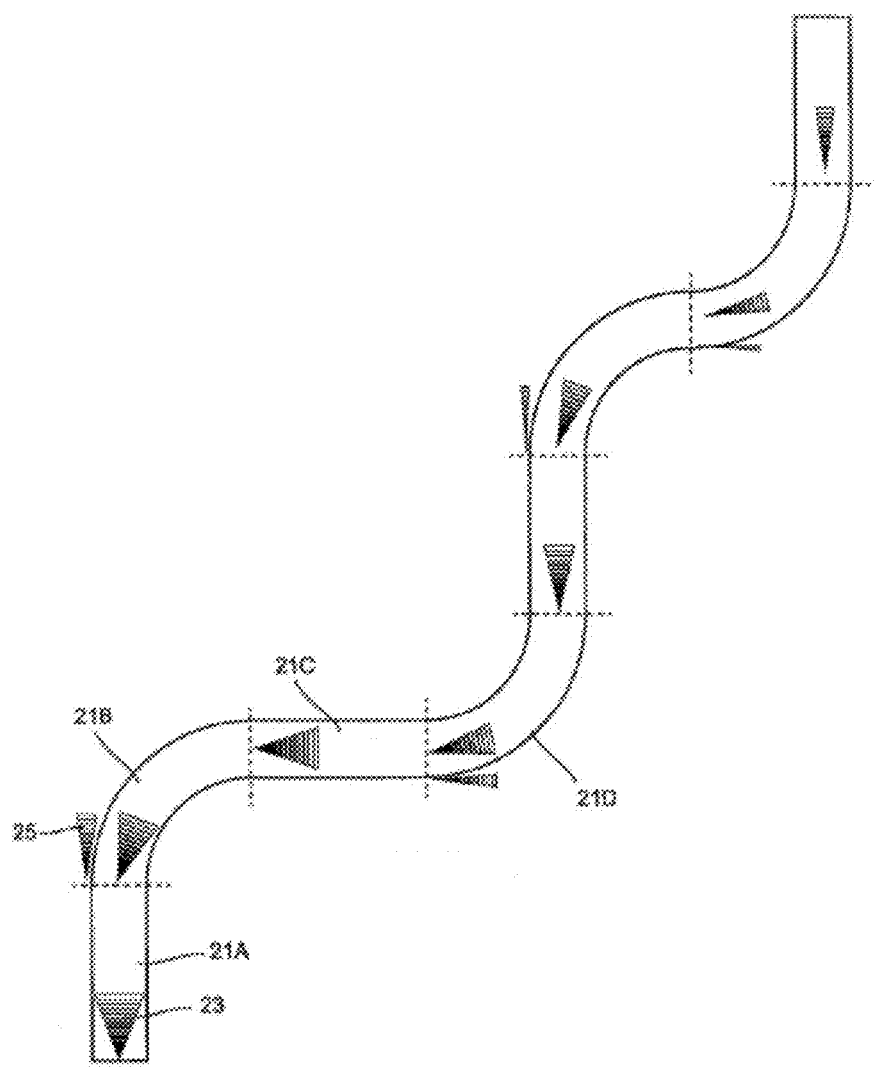
FIG. 6 shows a schematic representation of the curved waveguide of FIGS. 5A and 5B with an optical signal propagating along it.

FIGS. 5A and 5B show a schematic representation of a curved waveguide 19. The waveguide 19 is continuous but is shown being made up of plural sections 21A, 21B etc. Some of the sections 21A and 21C etc., are straight, and others 21B and 21D etc., are curved. In FIG. 6, a propagating optical signal 23 is shown. As can be seen the signal 23 passes from a straight section 21A to a curved section 21B, a proportion 25 of the signal is expelled for the reasons explained above. Typically, there is little loss when the signal passes from a curved section back to a straight section.

Referring to FIG. 6 a schematic description of a waveguide is shown with multiple bend segments and transition points between segments. An optical signal cone 23 represents the angular extent of a propagating optical signal bound by total internal reflection within the waveguide core. As seen there, upon transition of the optical signal from a straight section e.g. 21A to a curved section e.g. 21B a proportion of the optical signal energy is expelled from the waveguide. Transition losses are most apparent where there is a sudden reduction in radius of curvature. This also applies more strongly to "waveguide inflection points" where a curved waveguide segment immediately transitions to another waveguide segment curved in the opposite direction. Such an inflection point occurs between segment 21F and 21G. Transition losses at inflection points are typically greater than those between straight segments and curved segments. The reason for this is that there is a greater relative change in radius of curvature and therefore in the waveguide boundary conditions.

Figure 7:
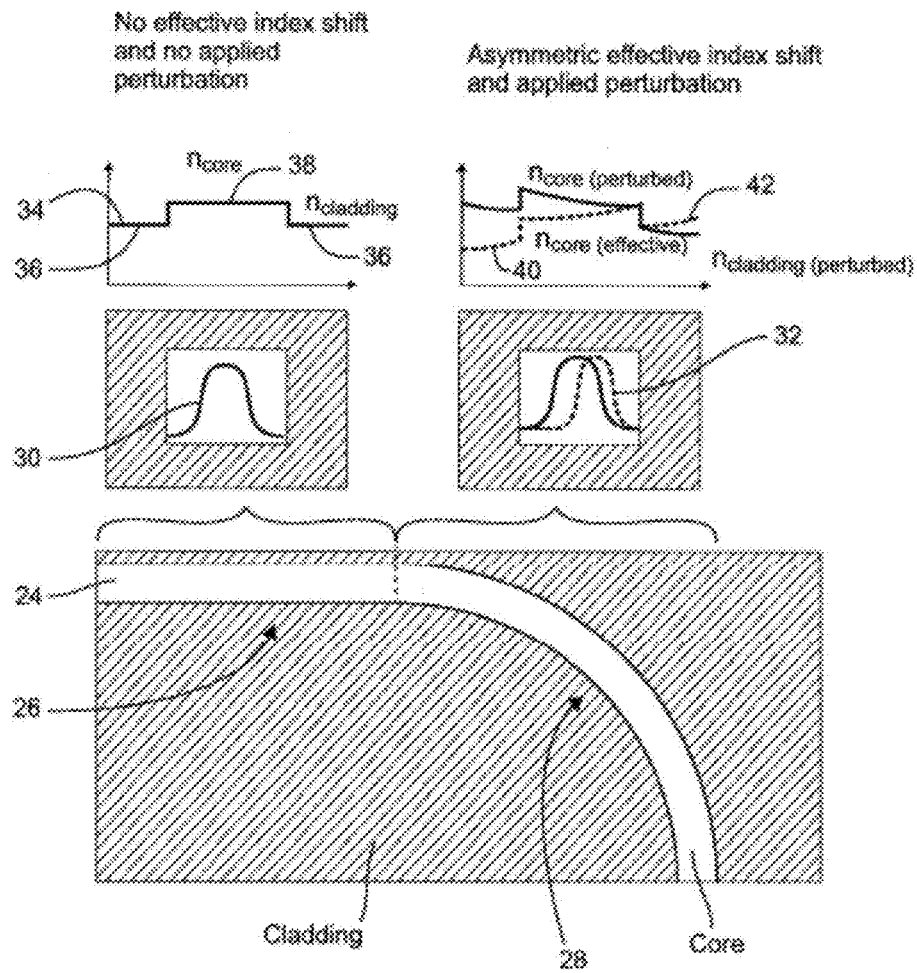
FIG. 7 is a schematic representation of a waveguide including a bent and straight portion modified according to the present disclosure.

Referring to FIG. 7, a waveguide 24 is provided having a straight section 26 and a curved section 28. The curved section may be considered a cylindrically curved waveguide. As explained above, due to differences between the boundary conditions in the straight section 26 and the curved section 28 certain optical modes supported in the former cannot be supported in the latter giving rise to "modal expulsion" as an optical signal propagates from the straight section to the curved section, whereby a portion of the optical signal energy is expelled from the waveguide during the transition. The energy of a central optical mode 30 (the fundamental mode in this case) is, after transition, coupled to higher order modes along the outer waveguide bend giving rise to the apparent squeezing of the mode 32 along the outer bend. Thus, a perturbation is applied to the transverse refractive index profile of the bent waveguide segment to compensate for the redistribution of modal energy during the transition. The perturbation is such that the waveguide has an asymmetric refractive index profile across the cross-section of the waveguide in dependence on the radius of the curved section. The perturbation and asymmetry is preferably radial with respect to the curve or bend of the waveguide. In other words, it is transverse to the longitudinal axis of the waveguide in the direction of the bend.

Typically, the width and height of the waveguide core would be between 30 and 100 microns. Preferably, the width and height is between 40 and 70 microns. The cross-section can be any desired shape, including any of square, rectangular, semi-circular or circular.

The waveguide is defined primarily by the core and a limited volume of the cladding around it to account for the refractive index change, bounding the optical modes and evanescent optical signal propagation (the "evanescent tail"), which occurs just outside the core. The disclosed index perturbations are, preferably, also applied to the cladding, however it should be noted that they should only be applied over a limited volume of surrounding cladding, which constitutes in combination with the core, the functional waveguide. Typically, this cladding volume, which serves as part of the functional waveguide, will extend to no more than 5 microns-10 microns beyond each core edge (either vertically or horizontally). Therefore, the index perturbation applied to the cladding surrounding the core need not extend to beyond 5 microns-10 microns outside the core edges.

The refractive index perturbation is preferably applied to both the waveguide cladding and the waveguide core since the containment characteristics of the waveguide are affected by the refractive index difference between the cladding and the core (henceforth referred to as the delta) and it is preferable to maintain a consistent delta as large variations can impact on certain waveguide performance characteristics such as dispersion. Waveguide dispersion determines the degree of pulse spreading in the waveguide and how far and how fast a signal can be sent before signal integrity is irretrievably impaired due to intersymbol interference. Dispersion increases with the numerical aperture of the waveguide, which in turn increases with the delta between core and cladding.

This is particularly relevant when dealing with tighter bends requiring larger asymmetric index perturbations. If, for example, the required perturbations were applied to just the core and not the cladding, then the delta on the inner bend would be significantly larger than that on the outer bend, which would adversely affect signal integrity.

In general, and as can be seen in FIG. 7, the outer core edge 42 is an inflection point where the effective index is the same. The index increases moving radially toward the center of the curve from this point and decreases moving radially away from the center of the curve.

The refractive index profile for the waveguide 34 includes both cladding sections 36 and a core section 38. In this example, the waveguide has a typical step-index index profile, whereby the index of the core section 38 and cladding sections 36 have a flat profile. The disclosed perturbation is applied to the refractive index of both the cladding and the core in the curved section 28 of the waveguide, with respect to that of the straight section 26.

The effective refractive index shift, signifying the profile, which applied to a straight waveguide segment, would cause it to behave like the curved waveguide 28, is shown with a dashed line. The refractive index required to compensate for the effect of the bend is shown in a solid line superposed in the same graph. It can thus be shown intuitively how the purpose of the required perturbation is to cancel the effective refractive index shift thus causing the waveguide to behave like a straight segment with the same profile as that of the preceding straight waveguide segment. Therefore, transition losses are eliminated or significantly reduced as the signal sees no change in boundary conditions (or effective refractive index profile) as it propagates from one segment to another.

Figure 8:
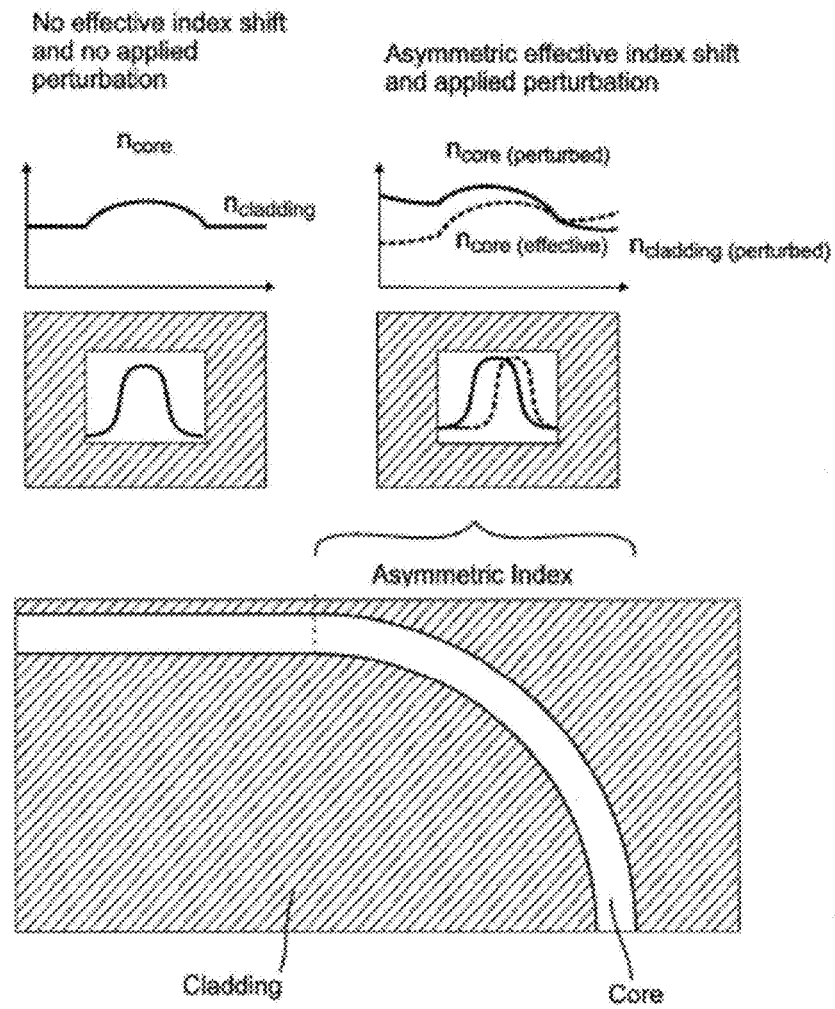
FIG. 8 is a schematic representation of a waveguide including a bent and straight portion modified according to the present disclosure.

FIG. 8 shows a similar embodiment to that of FIG. 7, except in this case the waveguide is not a step-index waveguide, but rather a graded-index waveguide, whereby the index of the core section varies parabolically around the center of the core, while the cladding has a flat index profile. As with FIG. 7 the refractive index perturbation applied to the curved section counteracts the effect of the bend and thus eliminates bend transition loss as the optical signal propagates from the straight section to the curved section.

Figure 9A:
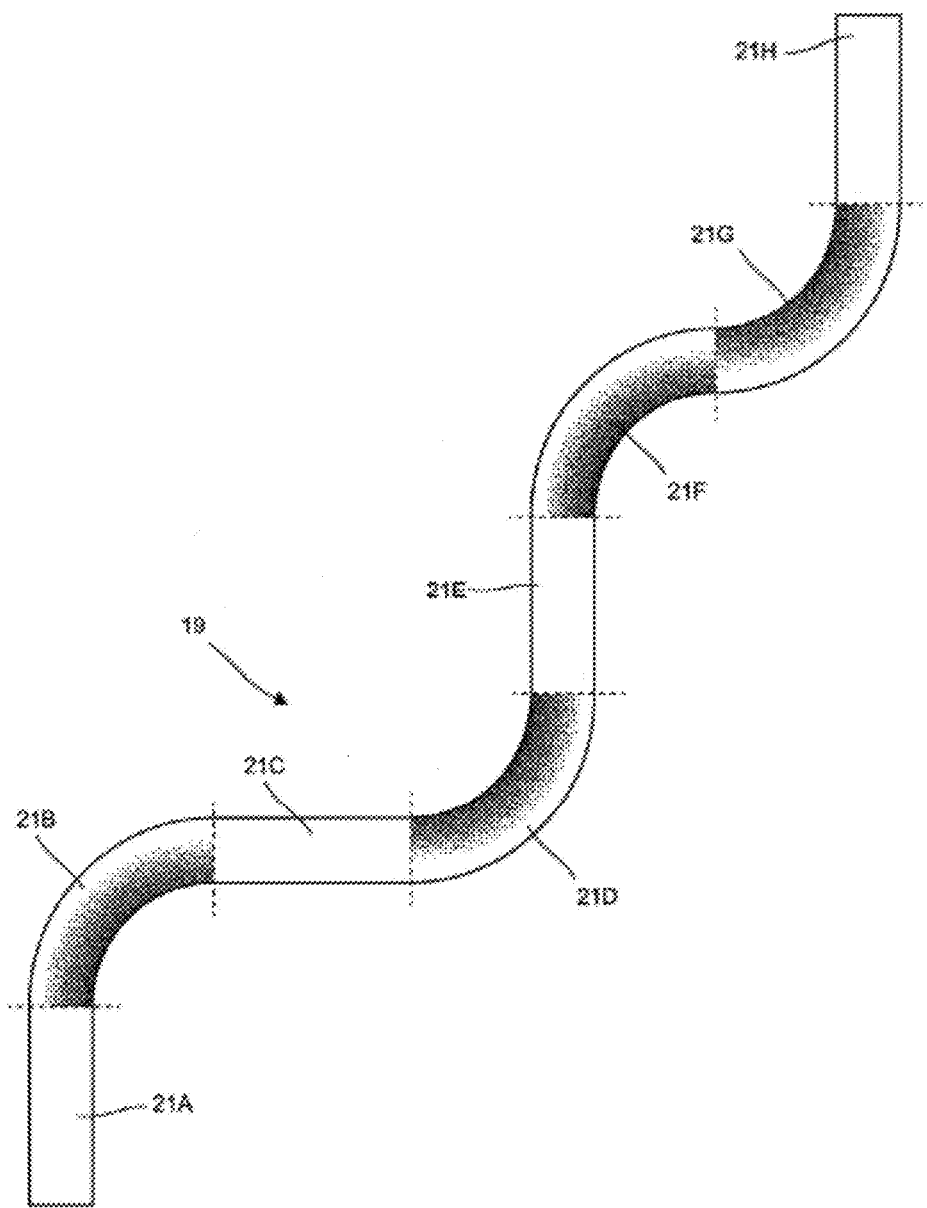
FIGS. 9A and 9B show schematic representations of a curved waveguide with a transverse perturbation in refractive index.
Figure 9B:
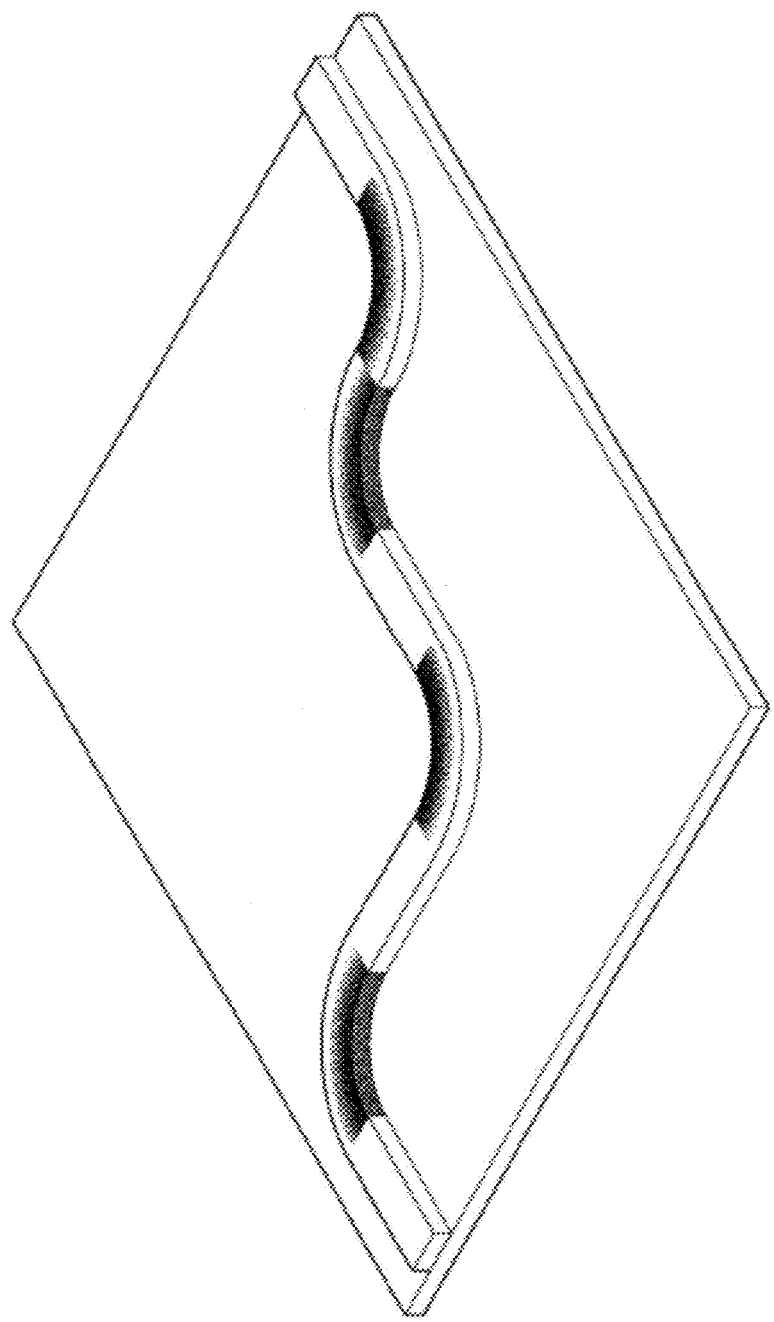
Figure 10:
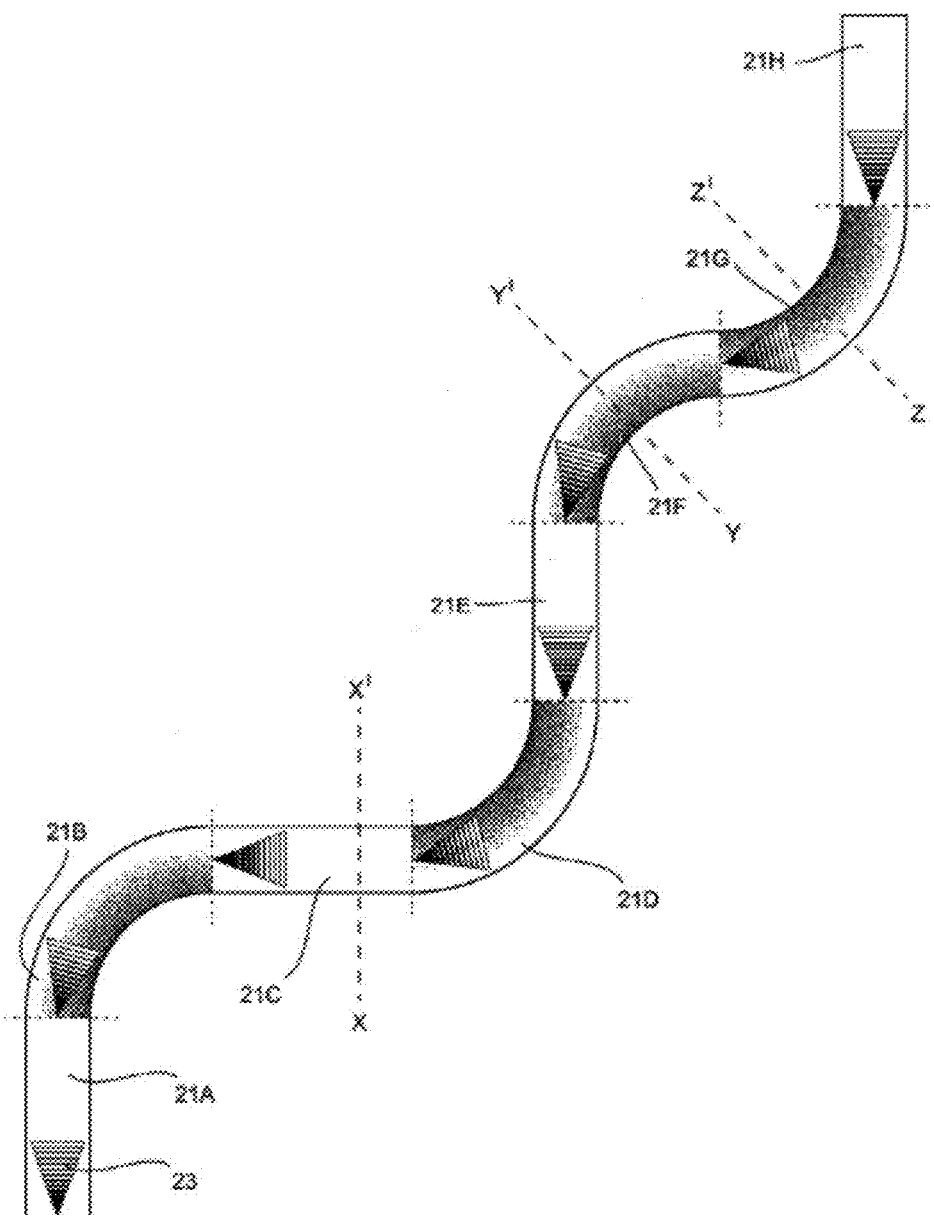
FIG. 10 shows a schematic representation of the curved waveguide of FIGS. 9A and 9B with an optical signal propagating along it.

Referring now to FIGS. 9A, 9B and 10 as, an example of the waveguide of FIGS. 5A and 5B is shown. However, in this case a transverse refractive index profile perturbation is applied as described above. On the inner side of the curved core sections, the refractive index is increased relative to the straight sections, as indicated by the shading. Accordingly, when the optical signal 23 passes from a straight section, e.g. 21A, to a curved section, e.g. 21B, there is substantially no expulsion of the optical signal energy. This enables a signal to propagate over a longer overall length of waveguide or a lower power of input signal to be used.

Figures 11A, 11B, 11C:
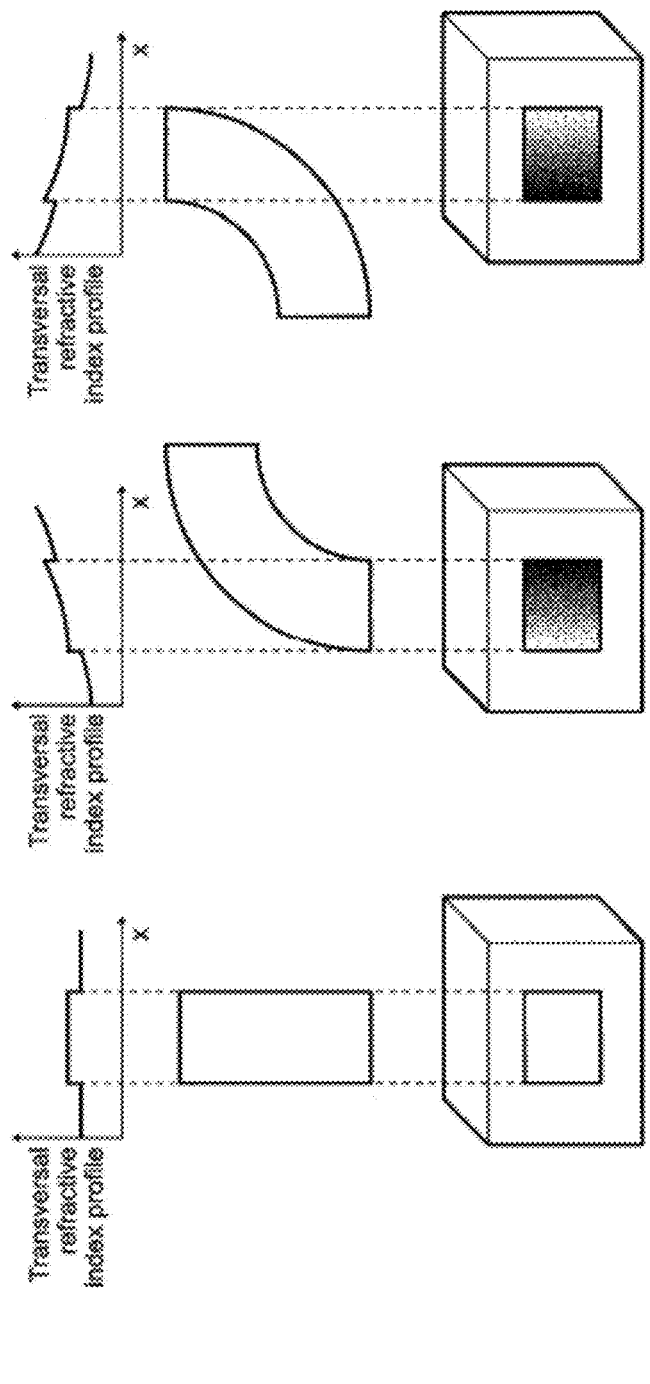
FIGS. 11A to 11C show schematic three dimensional representations of cross-sections through the waveguide of FIG. 10.

FIGS. 11A to 11C show schematic three dimensional representations of cross-sections through the waveguide of FIG. 10 along lines XX', YY' and ZZ', respectively. As can be seen in FIG. 11A the transverse refractive index profile is flat and represents that of a conventional step-index waveguide. In FIG. 11B, a perturbation is provided such that on the inside of the curve the refractive index is increased compared to that of the flat profile. In FIG. 11C, again on the inside of the curve the refractive index is raised compared to the flat profile.

As can be seen in the transverse refractive index profiles at the bottom of each figure, the perturbation occurs only in one dimension, namely the width x of the waveguide, with no change in refractive index occurring along the y axis. The reason for this is that the perturbation is only required within the plane in which the bends occur. As typically optical waveguides will be deposited on a flat substrate e.g. a PCB, and bends will occur within the plane of that substrate, the perturbation need only therefore be applied to one dimension. This significantly simplifies the manufacture of such perturbed waveguides.

In the rarer case in which waveguide bends occur out-of-plane, the refractive index profile will be the same however applied across the waveguide height (y-axis) as opposed to the waveguide width.

In the event the waveguide bends occur simultaneously both in-plane (in the x-z plane) and out-of-plane (in the y-z plane), then first the perturbation for one bend plane must be applied, then the perturbation for the second bend plane applied to the first perturbed profile as defined above.

FIGS. 12A to 12C show similar views to those of FIGS. 11A to 11C, except in this case the waveguides have circular cross-sections. Accordingly, as can be seen, the refractive index varies across the cross-section of the circular waveguide so as to provide the same effects discussed above, i.e. of reducing leakage of light when a signal passes from a first waveguide section having a first radius (e.g. a straight section) to a second waveguide section having a second, different, radius (e.g. a curved section).

Figures 13A, 13B, 13C:
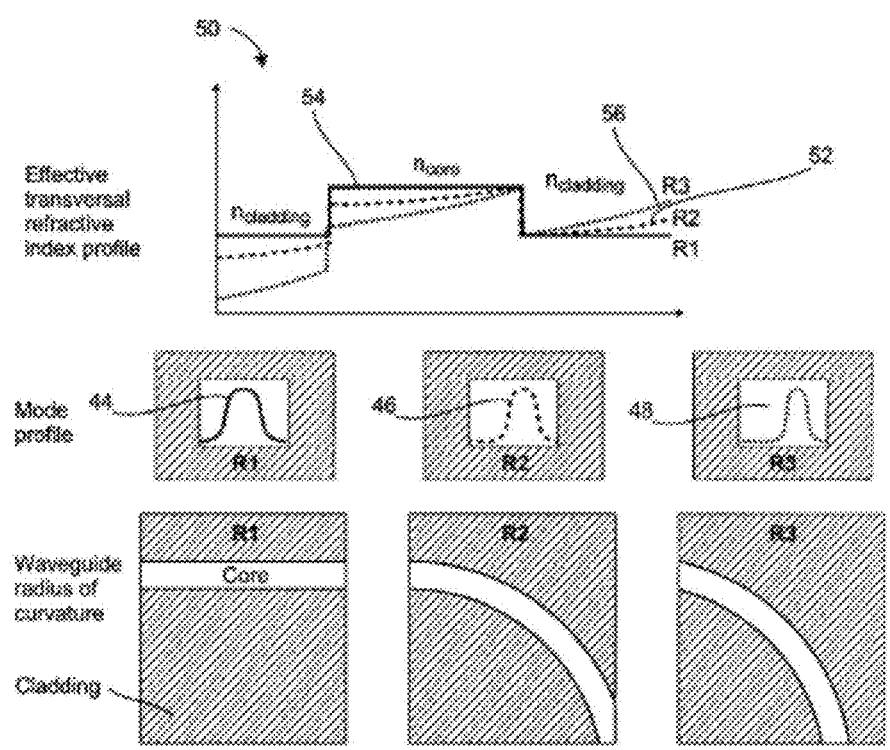
FIGS. 13A to 13C show examples of waveguides having different radii of curvature, with a representation of the corresponding effective variation in refractive index.

FIGS. 13A to 13C show three examples of waveguide sections in which the radius of curvature is different. In FIG. 13A, the radius R1 is effectively infinite given that the waveguide section is straight. The optical mode 44 is central to the waveguide core. In FIG. 13B, the waveguide has a radius R2. Accordingly, upon transition of the optical signal from segment R1 to R2, the optical energy of mode 44 is redistributed into a higher order modal distribution 46 on the outside of bend R2. As explained above such a transition would typically incur loss, as those modes supported in the straight segment R1, but not supported in the curved segment R2 would be expelled i.e. certain bound optical modes in segment R1 would be coupled to the radiation modes in segment R2. Similarly, in FIG. 13C, the curved segment R3 has an even smaller radius of curvature than R2 and therefore would incur a larger transition loss if the original signal R1 were coupled directly to segment R3, than would be incurred during the transition of the signal from R1 and R2. A transition loss would also occur between R2 and R3 as here too the waveguide undergoes a reduction in its radius of curvature. Such a transition would again give rise to a redistribution of optical modal energy into a tighter higher order mode profile 48.

A graph 50 is shown which demonstrates the variation in effective refractive index profile caused by the curving of the waveguide in sections R2 and R3.

The effective refractive index profile 54 for the straight segment R1 is unchanged from the real refractive index profile of the waveguide (step-index) due to an infinite radius of curvature. The effective index profile 52 for the curved segment R2 shows an asymmetric distortion of refractive index around an inflection point on the outer core edge, whereby the effective index decreases moving towards the center of the curve from the outer core edge and increases as we move away from the curve. The effective index profile 56 for the curved segment R3 shows the same asymmetric distortion of the step-index profile around the inflection point on the outer core edge, but to a greater degree as the curve is tighter.

In summary, as can be seen from the effective refractive index profiles 52 and 56 associated with R2 and R3 respectively, as the radius of curvature of a bend decreases, the degree of variation of the effective asymmetric profile from that of a normal (straight) segment increases.

Accordingly, using the present method a perturbation is applied to the refractive index profile of the waveguide in sections R2 and R3 so as to compensate for the effective distortion of the original index profile allowing optical signals propagating from one segment to the next to perceive little or no change in the effective transversal refractive index profiles and therefore to avoid the expulsion of optical energy at the segment interfaces.

It will be appreciated that typically in the layout of optical waveguides on an optical PCB, the entire length of a given segment will be formed with the same radius of curvature. Thus, the same perturbation can be applied along the whole length of the segment in question. However, in some cases the radius might vary along the length of the curved section, in which case the perturbation applied can similarly be varied along the length of the curved section.

Figure 14:
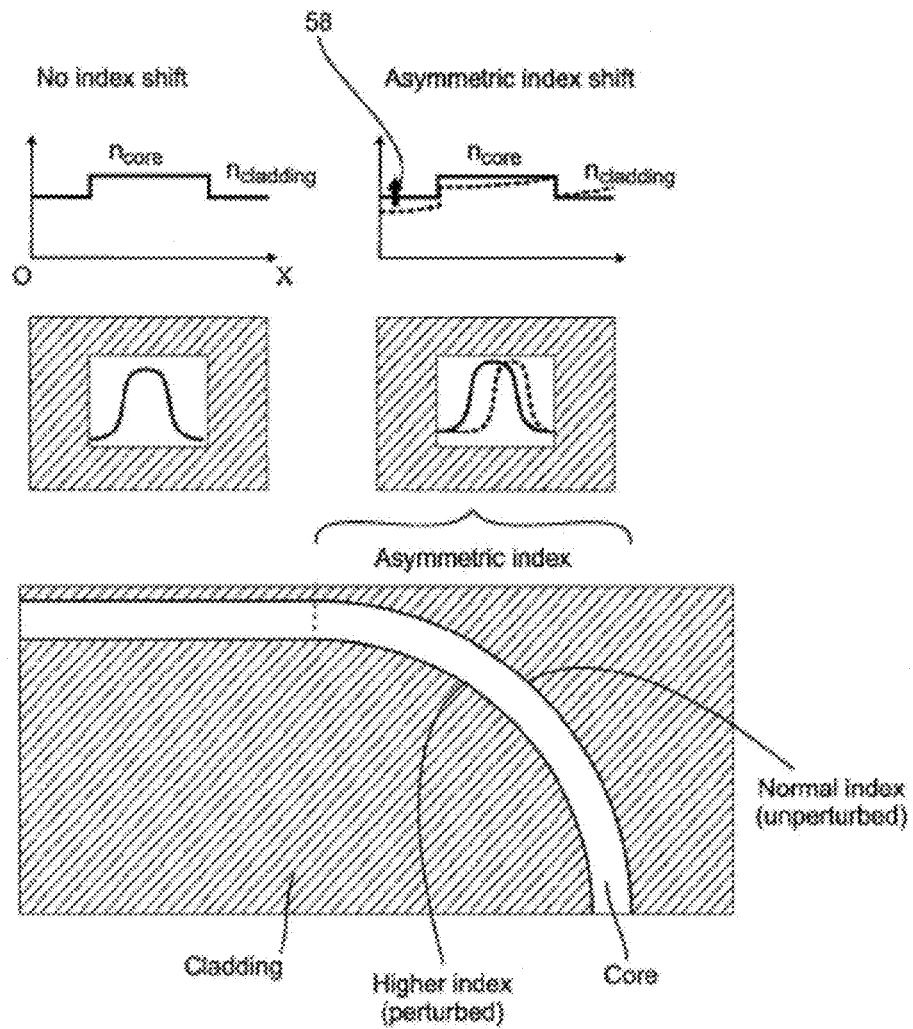
FIG. 14 is a schematic representation of an optical waveguide including a bent region and a straight region.

FIG. 14 shows a schematic representation of a waveguide including both a straight section and the curved section. As previously explained with respect to FIGS. 13A to 13C, a perturbation must be applied to the refractive index profile so as to ensure that the waveguide boundary conditions, which define the mode profiles that a given waveguide segment can support, do not change as an optical signal propagates from one segment having a first radius of curvature to a segment having a different radius.

In FIG. 14, a perturbation shift indicated by arrow 58 is applied to the refractive index of the waveguide so as to counteract the effective asymmetric bias in the refractive index caused by the waveguide curvature. As can be seen, the perturbation shift applied to the curved waveguide segment seeks to "pull" the effective refractive index profile back into the flat step-index profile of the straight waveguide segment preceding it.

In other words, what is provided, is an optical fiber or waveguide in which the actual transversal refractive index profile across the waveguide cross-section is varied so as to counteract the effective variation in transversal refractive index profile which occurs when a curved segment undergoes a conformal transformation to a straight section. Furthermore, all segments of differing radii of curvature can be "normalized" in this way i.e. have their effective refractive index profiles modified to match that of a straight section of the waveguide, to create a matching effective refractive index profile in all segments. Effectively the whole waveguide, regardless of layout should behave like one long straight waveguide of the same total length.

The term "waveguide segment" refers to a section of a waveguide that has a given radius of curvature. The waveguide itself will usually be a continuous structure. A straight segment effectively has an infinite radius of curvature, as explained above. The required perturbation P of refractive index for a curved segment is given by:

$$P = \frac{R_T}{r} \qquad (8)$$

And the perturbed refractive index $n_p$ at r is given by:

$$n_p(r) = P \cdot n_o = n_o(r) \cdot \frac{R_T}{r} \qquad (1)$$

(derived below), in which r is the radial distance from the origin of the curved waveguide at which the perturbed refractive index is calculated and $R_T$ is the constant value for the bend radius of the outer core edge of the waveguide (or waveguide segment).

By changing the refractive index profile of a waveguide as described, it is possible to counteract the changes in waveguide boundary conditions, which cause the expulsion of optical energy during propagation of an optical signal across the bend junctures between different waveguide segments. This expulsion of optical energy is commonly known as bend transition loss.

Linear Approximations of Asymmetric Refractive Index Perturbations

If it is not possible to change the refractive index exactly according to the perturbation formula disclosed herein due to manufacturing constraints, the required profile can be approximated by a linear or quasi-linear profile. This has the benefit of, in some cases, significantly simplifying manufacture or enabling the application of certain refractive index modifying stimuli, which lend themselves to a linearly or quasi-linearly changing influence, such as mechanical strain gradients, thermal gradients, electric field gradients and particle concentrations. Such stimuli can be thus applied to create a linear or quasi-linear asymmetric refractive index profile.

Thus, control of the refractive index profile of a waveguide as it varies between straight and curved sections enables bend losses to be counteracted and allows a waveguide of any design to behave effectively like a straight waveguide which experiences the least loss.

In disclosed waveguides and waveguides made using disclosed methods, an asymmetric refractive index perturbation is used to compensate for the effective refractive index shift which occurs across a waveguide when the waveguide experiences a change in its radius of curvature. Disclosed methods change the temperature, before, during, and/or after, curing in order to affect the density of the waveguide material thereby affecting the refractive index of the final waveguide. Disclosed methods can be utilized in combination with other influences capable of changing the refractive index, including curing methods during manufacture, and the application of electric field gradients, magnetic field gradients, mechanical stress or strain profiles, and particle concentration distributions.

Disclosed methods include step of depositing an uncured waveguide material on a substrate. Useful uncured waveguide material can include useful polymeric materials. In many embodiments the uncured waveguide material can include polyacrylate, polynorbonene or polysiloxane material, for example.

The uncured waveguide material has a first temperature when deposited on or in a substrate. Useful substrates can be any structure or article useful in fabricating waveguides, PCBS, etc. The uncured waveguide material has a density (e.g., mass/volume). The density of the uncured waveguide material is dependent on the temperature thereof. For example, in the absence of pressure constraints, as the temperature of the uncured waveguide material increases, the density is reduced; and as the temperature of the uncured waveguide material decreases, the density is increased. The density of the uncured waveguide material in turn affects the refractive index of the waveguide material once cured. As such, effecting localized changes in temperature of the uncured waveguide before, during, and/or after curing can affect localized changes in the refractive index of the waveguide material once cured. Such localized changes in the refractive index can be utilized to compensate for performance degradation when the waveguide geometry is changed, for example when the waveguide is about to change direction (e.g. when a tight bend is introduced), when the waveguide is about to cross over another waveguide at a certain angle, when a waveguide is split into multiple waveguides, or any combination thereof.

Disclosed methods therefore include a step of changing the temperature of at least a portion of the uncured waveguide material to a second temperature. The second temperature can be higher or lower than the first temperature. In some embodiments, the portion of the uncured waveguide material can be increased via heating and in some embodiments, the portion of the uncured waveguide material can be decreased via cooling. In some embodiments, the portion of the uncured waveguide material can be decreased by beginning at a temperature that is higher than the ambient temperature and allowing the uncured waveguide material to cool, thereby reducing the temperature of at least a portion of the uncured waveguide material.

Any useful source of heating can be utilized. Illustrative sources of heat can include a source of infrared (IR) energy. Illustrative sources of IR energy can include, for example a light emitting diode (LED), a laser, and a plasmonic source (e.g., as described in U.S. Pat. No. 8,427,925 (Zhao et al.) and U.S. Pat. No. 9,251,837 (Zhu et al.), the disclosures of which are incorporated herein by reference thereto). In some embodiments, a laser can be utilized as a heat source.

The portion of the uncured waveguide material, the temperature of which is changed, can be smaller than the cross section of the waveguide to be formed. In some embodiments, the portion of the uncured waveguide material, the temperature of which is changed, can be smaller than the cross section of UV curing. In some embodiments, the portion of the uncured waveguide material, the temperature of which is changed, can be 10%±3% of the cross section of the cross section of UV curing.

Disclosed methods can change the temperature of a portion of the uncured waveguide material before the curing step, after the curing step, during the curing step or any combination thereof. In some embodiments, the temperature of a portion of the uncured waveguide material can be changed at least before the curing step. In some embodiments, the temperature of a portion of the uncured waveguide material can be changed at least before and during the curing step. The heat conduction properties of the uncured waveguide material (e.g., polymeric material) controls the index of refraction properties of the waveguide material, at least in part, once cured.

Disclosed methods can include a step of curing the uncured waveguide material. In some embodiments, useful methods of curing include UV curing using a source of UV energy. Illustrative sources of UV energy include lasers. Additional details regarding the step of curing the uncured waveguide material and systems for effecting such curing can be found in U.S. Pat. No. 8,737,777 (Pitwon), the disclosure of which is incorporated herein by reference thereto. Additionally, systems disclosed in U.S. Pat. No. 9,044,907 (Pitwon), the disclosure of which is also incorporated herein by reference thereto can be utilized to combine a UV curing beam with a source of heat, for example.

The step of curing can affect different portions of the uncured waveguide material at different times, for example. The different portions need not be the same size. In some portions, one portion can be at least two times as large as the first portion, at least four times as large as the first portion, or at least five times as large as the first portion.

In an illustrative embodiment, a portion of the uncured waveguide material can be cured by a UV laser spot having a diameter of 50 micrometers (μm) and a smaller IR (for example) spot can be superimposed on the 50 μm curing spot while the uncured waveguide material is curing, for example, in order to affect the density and thereby the refractive index of the material while curing.

Waveguides formed using disclosed methods may be designed as multimode or singlemode. A multimode waveguide is a low cost option for integrating and coupling to embedded optical PCB channels. Singlemode waveguides enable ultra-low cost photonic integrated circuits, including silicon photonics, devices assembled directly onto small form factor boards.

Singlemode waveguides typically have a smaller core size, or lateral width, than multimode waveguides and typically exhibit less modal dispersion over a distance. Illustrative waveguides have a lateral width range of about 1-100 micrometers. The cross-sectional shape may be square, rectangular, half-dome, Gaussian-like, or another similar shape. In many embodiments, singlemode waveguides have a lateral width range of about 5-15 micrometers. In some embodiments, multimode waveguides have a lateral width range of about 35-100 micrometers.

The geometry of waveguides formed using disclosed methods can include geometries such as those formed using any known methods.

In some cases, waveguides formed on a substrate may include a linear segment, a non-linear segment, or any number thereof. For each waveguide, the segments may be arranged in series (e.g., adjacent to, contiguous with, or essentially continuous end-to-end). In some embodiments, the waveguide segments are formed according to a bend radius. A non-linear segment may be defined by one or more bend radii, as well as an arc angle (e.g., a right-angle turn being 90 degrees) and a length of the segment (including one or more arc lengths), to form an overall shape of the non-linear segment on the planar surface. An illustrative non-linear segment defined by one bend radius forms a portion of a circle along an arc angle, such as a quarter circle that guides electromagnetic radiation around an arc angle of 90 degree bend. A linear segment may be considered to define a bend radius that is infinite. Non-limiting examples of smaller bend radii include about 15 mm, about 10 mm, about 5 mm, or about 1 mm. Accordingly, larger bend radii may range anywhere from the smaller bend radii to less than infinity.

Although some embodiments of a non-linear segment are single bend radius segments defined by a single bend radius along the length of the segment to achieve an arc angle, many other embodiments are graded bend segments defined by multiple incremental waveguide segments, each defining a bend radius incrementally changed from the bend radius of the previous incremental segment, to achieve the arc angle. In many embodiments, the graded bend segment defines gradually increasing bend radii. Due to having multiple bend radii, a graded bend segment defines a non-circular curve along its length. Non-limiting examples of graded bend segments include an oval section, an ellipse section, a parabola section, a hyperbola section, a sinusoidal section, an S-shape section, among others. In various embodiments, a non-linear segment is defined by multiple bend radii to form a convex segment, a concave segment, or combinations of both (e.g., an S shape).

Using a graded bend segment in a waveguide can improve optical losses versus a single bend radius segment, because the maximum bend mismatch from segment-to-segment can be reduced. In one example, a single bend radius segment defines a single bend radius X to achieve an arc angle and maintains the bend radius along its length wherein $\Delta X$ is the change from the preceding segment's bend radius to X. On the other hand, in another example, a graded bend segment defines the bend radius of the first incremental segment as $Y_1$ and defines an incremental arc angle from the preceding segment's bend radius to Y as $\Delta Y_1$, which is less than $\Delta X$. In addition, $\Delta Y_2, \Delta Y_3, \ldots$ and $\Delta Y_n$ represent the bend radius changes between subsequent incremental segments, which are each less than $\Delta X$. Due to the slower change in bend radius along the arc angle, in some embodiments, the graded bend segment has a longer length than the arc length of a single bend radius segment achieving the same arc angle.

In many embodiments, the arc length of each of the plurality of incremental waveguide segments is a fraction of the total length of the graded bend segment, which may be less than about 50%, less than about 33.3%, less than about 25%, less than about 20%, less than about 10%, less than about 5%, or less than about 1%. The arc length of each incremental segment may be the same or different. In one embodiment, the number of incremental segments, the arc length of each, the change in bend radius from segment-to-segment, or a combination thereof is selected to improve optical loss in the waveguide.

Also disclosed herein are planar optical waveguides having a curved section, the planar optical waveguide comprising cured polymeric material, the planar optical waveguide having at least a portion of the cross-sectional refractive index profile controlled by heat conduction properties of the polymeric material when in the uncured state.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures.

Embodiments of waveguides and methods of making waveguides are disclosed. The implementations described above, and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:
1. A method of making a planar optical waveguide comprising:
depositing an uncured waveguide material on a substrate, the uncured waveguide material having a first tempera- ture when deposited and the uncured waveguide material having a density dependent on the temperature thereof;

changing the temperature of at least a first portion of the uncured waveguide material to a second temperature; and curing the uncured waveguide material via application of UV energy to a second portion of the uncured waveguide material to form the planar optical waveguide, changing the temperature taking place at least before curing during curing or both, wherein the first portion of the uncured waveguide material is smaller than the second portion of the uncured waveguide material.

2. The method according to claim 1, wherein the second temperature is higher than the first temperature.

3. The method according to claim 1, wherein the second temperature is lower than the first temperature.

4. The method according to claim 1, wherein the step of changing the temperature takes place at least before the curing step.

5. The method according to claim 1, wherein the step of changing the temperature takes place at least before and during the curing step.

6. The method according to claim 1, wherein the step of changing the temperature of the uncured waveguide material comprises use of a source of infrared energy.

7. The method according to claim 1, wherein the step of curing the uncured waveguide material comprises use of a source of ultraviolet (UV) energy.

8. The method according to claim 1, wherein the step of changing the temperature of at least a portion of the uncured waveguide material affects a first portion of the uncured waveguide material at a first time and the step of curing the uncured waveguide material affects a second portion of the uncured waveguide material at a second time.

9. The method according to claim 8, wherein the second portion is larger than the first portion.

10. The method according to claim 8, wherein the second portion is at least two times to five times larger than the first portion.

* * * * *